Nov. 7, 1967 E. E. MASTERSON 3,351,744
SYNCHRONIZED DOCUMENT READER
Filed Dec. 30, 1963
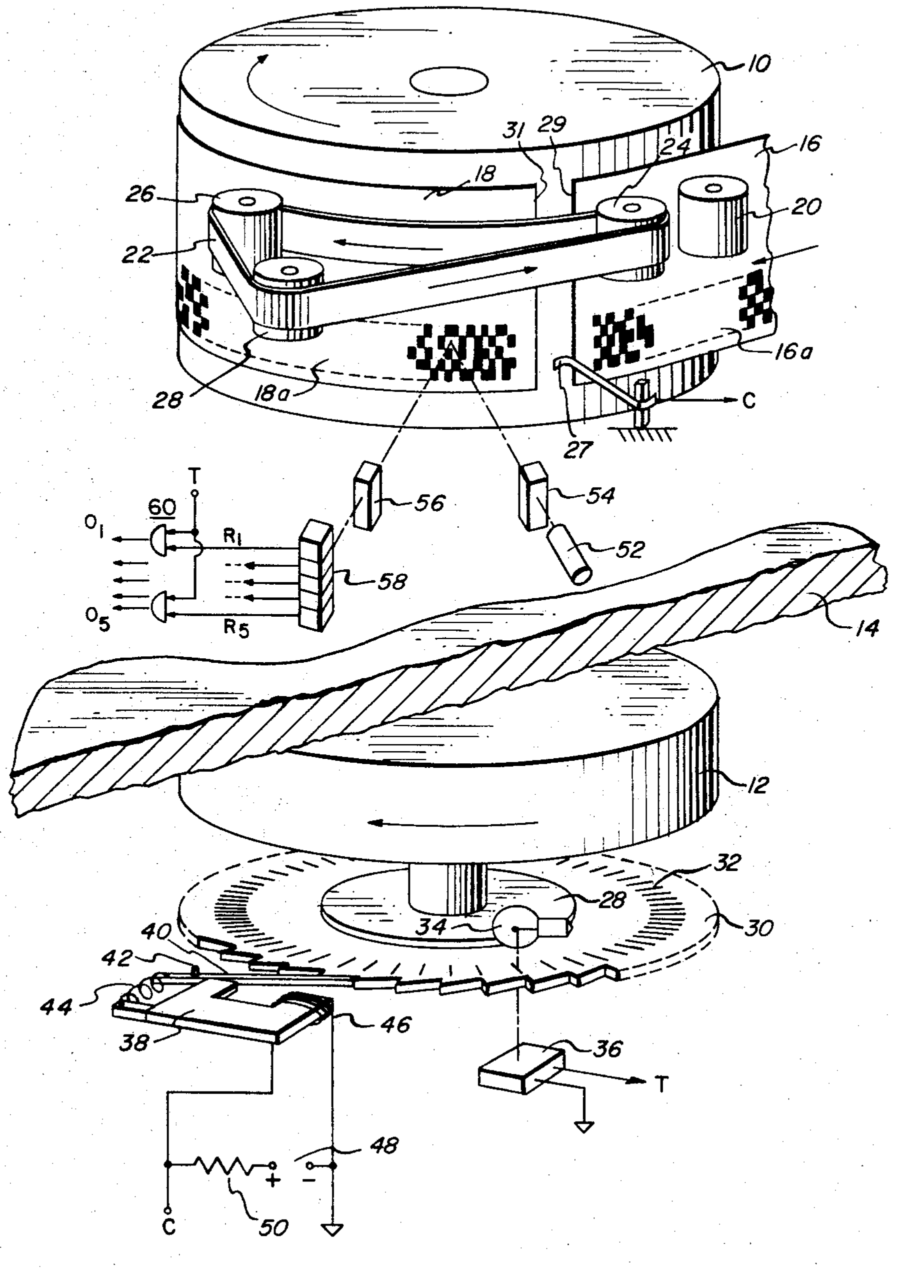
INVENTOR.
EARL E. MASTERSON
BY
Fred Jacob
ATTORNEY United States Patent Office 3,351,744

Patented Nov. 7, 1967

3,351,744

SYNCHRONIZED DOCUMENT READER

Earl E. Masterson, Newtonville, Mass., assignor to Honeywell Inc., a corporation of Delaware Filed Dec. 30, 1963, Ser. No. 334,270
7 Claims. (Cl. 235—61.11)

ABSTRACT OF THE DISCLOSURE

A synchronized reader for documents, wherein timing means are selectively coupled to document feed means so as to move therewith and to generate timing pulses for gating the information which is read out.

The present invention relates in general to a new and improved document reader, in particular to apparatus for synchronously reading out a sequence of data indicia from a document.

In document readers the data indicia are normally read out against a time reference for the purpose of discriminating between data and extraneous signals and in order to generate sharply defined output pulses in time synchronism. This is particularly important in optical document readers where extraneous signals may be generated due to smudges, marks, or other defacement of the document. Where the data indicia take the form of a bar code which is to be read out optically, the generation of the timing pulses must evidently bear a predetermined relationship to the appearance of the bar code sequence on the document. Thus, timing pulses for the purpose of data readout are generated only when the bar code is being read out, taking into account the fact that the spacing between successive documents may vary. The equipment for deriving timed output pulses must be simple, economical and reliable and must, moreover, be capable of operating at relatively high speeds.

Accordingly, it is the primary object of the present invention to provide apparatus for generating timing pulses for an optical document reader which is both simple in construction and inexpensive to build.

It is another object of the present invention to provide a document reader wherein timing pulses are reliably generated at high document transfer rates.

It is a further object of the present invention to provide an optical bar code reader wherein timed output pulses are reliably derived in synchronism with the appearance of the bar code on the document.

These and other objects of the present invention, together with various features thereof, will become apparent from the following detailed specification, when read with the accompanying drawing, in which the sole figure illustrates a preferred embodiment of the invention.

With reference now to the drawing, a document feed drum 10 is rigidily connected to a drive pulley 12 which may be positioned beneath a work table 14. For the sake of clarity, the actual mechanical coupling has not been illustrated in the drawing, but it will be understood that such coupling may constitute an ordinary shaft fixedly engaged both by the feed drum and the drive pulley either directly or through a gear train. Rotary power may be belt-coupled to the drive pulley from a suitable source to rotate the pulley in the direction shown by the arrow thereon. Such power is transmitted from the drive pulley to the feed drum 10, which rotates in the direction of the arrow shown thereon.

Documents, such as the cards 16 and 18, are supplied to the feed drum 10 from a supply source, not shown, each card having a leading edge 29 and a trailing edge

31. Each of the cards contains a data portion, labeled 16_a_ and 18_a_ respectively in the drawing, and taking the form of five tracks of imprinted bar code in the preferred embodiment of the invention. A pressure roll 20 may be positioned as shown, so as to resiliently urge the arriving card 16 against the feed drum 10. An endless belt 22 is disposed to rotate about a set of rollers 24, 26 and 28, the belt section between the rollers 24 and 26 being adapted to contact a portion of the perimeter of the drum. The drum motion is transmitted to the belt as indicated by the arrows on the latter. A sensing arm 27 is positioned to be resiliently urged against the drum 10 and to make electrical contact therewith in the absence of a card. An electrical signal C is derived from a terminal on the sensing arm.

A clutch 28 is rigidly coupled to the drive pulley 12 and frictionally engages a timing disc 30 having a toothed periphery. The timing disc further contains radial slits 32 with a center-to-center spacing corresponding to the normal spacing of successive code bars in each track on the data portion of each document. A light source 34 and a photocell 36 are positioned on opposite sides of the timing disc 30, responsive timing pulses T being derived at the output of the photocell.

A solenoid 38 is disposed in a plane with the aforesaid timing disc and includes an armature 40 arranged to rotate about a pivot 42. The armature 40 may constitute a pawl which, due to the action of a tension spring 44 normally egages the teeth of the timing disc 30 to lock the latter against rotation. The solenoid 38 further includes a winding 46 adapted to be energized by a control signal applied to its terminals. The terminals of the winding 46 are connected across a DC source 48 coupled in series with a limiting resistor 50. One side of the DC source is seen to be grounded, while the junction point between the resistor 50 and the winding 46 is further connected to receive the aforesaid signal C.

A read station for reading out documents comprises a light source 52 and a first optical lens system 54 through which a restricted section of the data portion that is under the read station at any given time, is illuminated. The illuminated data portion is scanned by a read head 58 through a second optical lens system 56. The read head 58 is seen to consist of five separate cells, one corresponding to each code bar track of the data section. Responsive readout signals $R_1$ to $R_5$ are derived at the output of the read head 58. These signals are gated together with the aforesaid timing pulses T in a corresponding set of gates 60, to derive timed output signals $O_1$ to $O_5$.

In operation, the cards are successively fed from the supply source to the feed drum 10, as indicated by the cards 16 and 18. On arrival, the roller 20 resiliently urges each card against the rotating feed drum to retain it in position until its leading edge 29 passes under the roller 24. Thereafter, the card is retained against the feed drum by the section of the belt 22 between the rollers 24 and 26 and is thus carried past the read station. Assuming that the feed drum 10 is grounded, the signal C will be at ground potential as long as the sensing arm 27 makes contact with the drum surface. Thus, both input terminals of the solenoid winding 46 will be at ground potential and no control signal is applied to the winding.

When the leading edge 29 of the card passes under the sensing arm 27, the latter is no longer at ground potential. Accordingly, a DC control signal, as determined by the source 48 and the resistor 50, is now applied across the solenoid winding 46. In response, the pawl 40 is attracted and is thereby disengaged from the toothed periphery of the timing disc 30. The latter is now permitted to rotate with the clutch 28 which, as previously explained, is rigidly coupled to the drive pulley 12.

As the timing disc rotates, the photocell 36 generates a timing pulse T each time the light from the source 34 strikes it through one of the slits 32. As previously explained, the spacing of the slits corresponds to that of the code bars of the data on the cards so that timing pulses are applied to the gates 60 in synchronism with the predetermined spacing of the sequentially disposed code bars in each data track.

A restricted 5-track section of the data portion 18*a*, which is seen to be at the read station in the drawing, is illuminated through the optical lens system 54. The illuminated section is scanned by the read head 58 through the optical lens system 56. Each space in each track where no black code bar appears, thus produces a readout signal R in the corresponding signal channel. The readout signals R for corresponding spaces of the respective tracks, are gated with the aforesaid timing pulse T to produce timed output pulses O.

In the arrangement shown, the occurrence of a smudge, mark, or other defacement in the data section of the document, may readily result in a readout signal R. However, the presence of such a spurious signal will not give rise to an output pulse, unless it occurs during the relatively narrow time interval in which a timing pulse T is generated. As a consequence, the great majority of such spurious data are eliminated at the outset to provide reliable document readout.

When the trailing edge 31 of the scanned card moves under the sensing arm 27, the latter again makes contact with the surface of the drum 10 and the signal C reverts to ground. The control signal which energizes the solenoid is thereby terminated. As a result, the spring 44 moves the pawl 40 into position to lock the timing disc against further rotation and the rotating clutch 28 again slips on the disc.

The preferred embodiment of the invention illustrated in the drawing may be modified in various ways, all of which lie within the scope of the present invention. For example, signal C which governs the control signal need not be generated by means of a mechanical sensing arm. The leading and trailing edges of the card may, for example, be sensed by optical means to produce a control signal responsive to the presence and absence respectively of a document. Such optical sensing means may also be employed to sense the beginning and end of each data section, rather than the leading and trailing edges of the card. In the latter case, however, the apparatus response time must be faster so as to initiate the generation of timing pulses as soon as the data portion arrives at the read station.

It will also be apparent that the pawl may normally be out of contact with the timing disc and may engage the latter only upon the occurrence of one of the aforesaid control signals. The pawl itself may be separate from the solenoid armature, but actuated from the latter. The timing disc itself need not have slits but may, for example, carry magnetic markers for generating the desired timing pulses of short duration. Similarly, the belt arrangement shown in the drawing for holding the card against the feed drum 10 is exemplary only. Various substitutes, such as clamps or the like may be employed to accomplish the same end. In lieu of the pawl arrangement, the clutch may be arranged for selective engagement of the timing disc 32 in response to the control signal C. Such engagement or disengagement must, however, be capable of occurring rapidly in order to achieve the desired response.

As pointed out above, the center-to-center spacing of slits 32 on the timing disc 30 must correspond to the spacing of the code bars in the data section 18*a*. It will be clear that there need not necessarily be a one-to-one correspondence, but that the timing disc, because the gearing, may in fact rotate at a rate different from, but tied to, that the feed drum. In the latter case, the timing slits 32 may either be spaced further apart or closer together, depending upon the requirements of the situation, so that correspondence between the timing signals and the code bar spacing is maintained.

It will be apparent from the foregoing disclosure of the invention that numerous modifications, changes and equivalents will now occur to those skilled in the art, all of which fall within the true spirit and scope contemplated by the invention.

What is claimed is:

1. Apparatus for synchronously reading out a sequence of spaced data indicia from a document, comprising a read station responsive to said indicia to provide corresponding readout signals, a rotatable document feed drum for moving successive documents past said feed station, means responsive to the initiation of each sequence of data indicia to generate a control signal, a rotatable timing disc having markers spaced thereon substantially corresponding to said sequence of data indicia, a sensing station responsive to said markers to derive corresponding timing pulses, means for gating said readout signals with said timing pulses to provide timed output pulses, rotatable clutch means fast with said feed drum and frictionally engaging said timing disc, a pawl normally engaging said timing disc to prevent rotation of the latter, means responsive to said control signal to retract said pawl from engagement with said timing disc, and means responsive to the completion of each sequence of data indicia to terminate said control signal.

2. Apparatus for synchronously reading out a sequence of data indicia from a document, comprising a read station responsive to said indicia to provide corresponding readout signals, a rotatable document feed drum for moving successive documents past said read station, a rotatable timing disc bearing markers corresponding to said data indicia, a sensing station responsive to the appearance of the said markers to provide corresponding timing pulses, clutch means fast with said feed drum adapted to couple said timing disc to the latter for joint rotation therewith during the appearance of said data indicia at said read station, means for rendering said clutch means ineffective in the absence of a document, and means for gating said readout signals with said timing pulses to provide timed output pulses.

3. Apparatus for synchronously reading out data indicia from documents, comprising a read station responsive to said indicia to provide corresponding readout signals, document feed means for moving successive documents past said read station, timing means selectively movable with said feed means to generate timing pulses, means operative during the appearance of said data indicia at said read station for coupling said timing means and said feed means for joint movement, means for decoupling said timing means from said feed means in the absence of a document, and means for gating said readout signals with said timing pulses to derive timed output pulses.

4. Apparatus for synchronously reading out printed bar code data from a document, comprising a readout station including means for optically scanning said bar code to derive corresponding readout signals, a feed drum for moving successive documents past said readout station, means for sensing the leading edge of each document to generate a control signal, a toothed, rotatable timing disc including radial slots having a center-to-center spacing corresponding to said bar code, scanning means responsive to said slots to generate corresponding timing pulses, means for gating said readout signals with said timing pulses to derive timed output pulses, a clutch fast with said feed drum and frictionally engaging said timing disc, a solenoid, a pawl adapted to be activated by said solenoid, said pawl being resiliently urged into contact with the teeth of said timing disc to lock the latter against rotation with said clutch, means for energizing said solenoid with said control signal to retract said pawl, and means responsive to the completion of said bar code data in each document to terminate said control signal.

5. Apparatus for synchronously reading out printed bar code data from a document, comprising a readout station, a feed drum, means cooperating with said feed drum to retain a document thereagainst, means for rotating said feed drum to move successive documents past said read station, means for mechanically sensing the presence of each document prior to its arrival at said read station, means responsive to said sensing means for deriving a control signal for the duration of said document at said read station, said readout station including a first light source for illuminating said bar code, a photoelectric reading head for scanning said illuminated bar code to derive corresponding readout signals, a slip clutch coaxially fast with said drum, a toothed timing disc including radial slots with a center-to-center spacing corresponding to that of said code bars, a second light source disposed on one side of said timing disc, photoelectric sensing means disposed on the other side of said timing disc in line with said second light source and said slots to generate timing pulses corresponding to said slots, a pawl normally urged into engagement with the teeth of said timing disc to lock the latter against rotation with said clutch, and a solenoid responsive during the presence of said control signal to disengage said pawl from said timing disc.

6. An optical card reader for reading data in the form of predetermined marks appearing on each card in preassigned spaces, comprising a read station including a first light source, a photo-electric scanner responsive to the occurrence of said marks to provide coresponding readout signals, a feed drum rotatably adapted to carry successive past said read station, means for driving said drum, means for sensing the leading and trailing edges of each of said cards, means responsive to the sensing of said leading and trailing edges to initiate and terminate respectively a control signal, a friction clutch positioned to rotate with said drum, a rotatable timing disc engaged by said clutch, said timing disc having ratchet teeth spaced around its periphery, said disc further including radial slits corresponding to said pre-assigned spaces, a second light source positioned on one side of said timing disc, a photocell positioned on the other side of said disc in line with said second light source and said slits for generating timing pulses in response to said slits, a pawl normally urged into contact with said ratchet teeth to lock said disc against rotation with said clutch, a solenoid responsive to the presence of said control signal to move said pawl out of engagement with said timing disc, and means for gating said readout signals with said timing pulses.

7. Apparatus for synchronously reading out data indicia from data-bearing documents, comprising a read station responsive to said indicia to provide coresponding readout signals, document feed means for moving successive documents past said read station, timing means selectively movable with said feed means to generate timing pulses, means operative during the appearance of each of said documents at said read station for substantially immediately initiating movement of said timing means synchronously with said feed means, means for arresting said timing means in the absence of a document, and means for gating said readout signals with said timing pulses to derive timed output pulses.

References Cited

UNITED STATES PATENTS

| | | | |
|---|---|---|---|
| 3,055,582 | 9/1962 | Battison et al. | 235—61.11 |
| 3,173,000 | 3/1965 | Johnson et al. | 235—61.11 |
| 3,222,502 | 12/1965 | Husted | 235—61.11 |
| 3,229,073 | 1/1966 | Macker et al. | 235—61.11 |

DARYL W. COOK, *Acting Primary Examiner.*

J. I. SCHNEIDER, *Assistant Examiner.*